(12) United States Patent
Tsuji et al.

(10) Patent No.: US 6,275,945 B1
(45) Date of Patent: *Aug. 14, 2001

(54) APPARATUS FOR RADIATING HEAT FOR USE IN COMPUTER SYSTEM

(75) Inventors: Hiroyuki Tsuji; Keiichi Kato, both of Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,245

(22) Filed: Nov. 19, 1997

(30) Foreign Application Priority Data

Nov. 26, 1996 (JP) .................................................. 8-314846
Jan. 30, 1997 (JP) .................................................. 9-016822

(51) Int. Cl.⁷ .............................. G06F 1/26; G06F 13/00; G06F 1/20
(52) U.S. Cl. ..................... 713/300; 713/322; 713/310; 713/340; 713/330; 713/323; 710/101; 710/102; 710/103; 710/100; 361/686; 361/687; 361/695; 361/698; 361/699; 361/704
(58) Field of Search ................... 713/300, 322, 713/310, 320, 340, 330, 323; 361/695, 698, 699, 687, 704; 307/116; 710/324, 101, 102, 103, 100

(56) References Cited

U.S. PATENT DOCUMENTS

| | | | |
|---|---|---|---|
| 4,825,337 | * | 4/1989 | Karpman ............................. 361/386 |
| 5,381,043 | * | 1/1995 | Kohiyama et al. ................ 307/116 |
| 5,394,936 | * | 3/1995 | Budelman ....................... 165/104.33 |
| 5,428,798 | * | 6/1995 | Sekine et al. ......................... 713/300 |
| 5,463,742 | * | 10/1995 | Kobayashi .......................... 710/101 |
| 5,475,563 | * | 12/1995 | Donahoe et al. .................... 361/695 |
| 5,504,924 | * | 4/1996 | Ohashi et al. ....................... 375/800 |
| 5,537,343 | * | 7/1996 | Kikinis et al. ....................... 361/687 |
| 5,550,710 | * | 8/1996 | Rahamin et al. .................... 361/687 |
| 5,574,667 | * | 11/1996 | Dinh et al. ........................... 364/557 |
| 5,642,517 | * | 6/1997 | Shirota ................................. 713/340 |
| 5,652,891 | * | 7/1997 | Kitamura et al. ................... 713/324 |
| 5,721,837 | * | 2/1998 | Kikinis et al. ....................... 710/101 |
| 5,768,101 | * | 6/1998 | Cheng ................................. 361/687 |
| 5,808,869 | * | 9/1998 | Donohoe et al. .................... 361/704 |
| 5,832,237 | * | 11/1998 | Lee ...................................... 710/101 |
| 5,848,282 | * | 12/1998 | Kang ................................... 713/323 |
| 5,881,298 | * | 3/1999 | Cathey ................................. 710/324 |
| 5,884,049 | | 3/1999 | Atkinson . |

FOREIGN PATENT DOCUMENTS

| | | |
|---|---|---|
| 3-3030 | 1/1991 | (JP) . |
| 5-73174 | 3/1993 | (JP) . |
| 5-67080 | 9/1993 | (JP) . |
| 9-18179 | 1/1997 | (JP) . |

* cited by examiner

Primary Examiner—David Wiley
Assistant Examiner—Frantz B. Jean
(74) Attorney, Agent, or Firm—Finnegan, Henderson, Farabow, Garrett, & Dunner, L.L.P.

(57) ABSTRACT

In a computer system using an expanded unit for obtaining an expanded function, a heat sink of a computer main body and a heat sink of the expanded unit are connected to each other when the computer main body and the expanded unit are connected to each other. A surface area of the heat sink can be increased, and the radiation effect can be improved. Thereby, the computer main body can be operated under a full power mode in which sufficient radiation effect is assumed. Particularly, the performance of a small-sized computer whose setting space of the heat sink is limited can be improved.

20 Claims, 13 Drawing Sheets

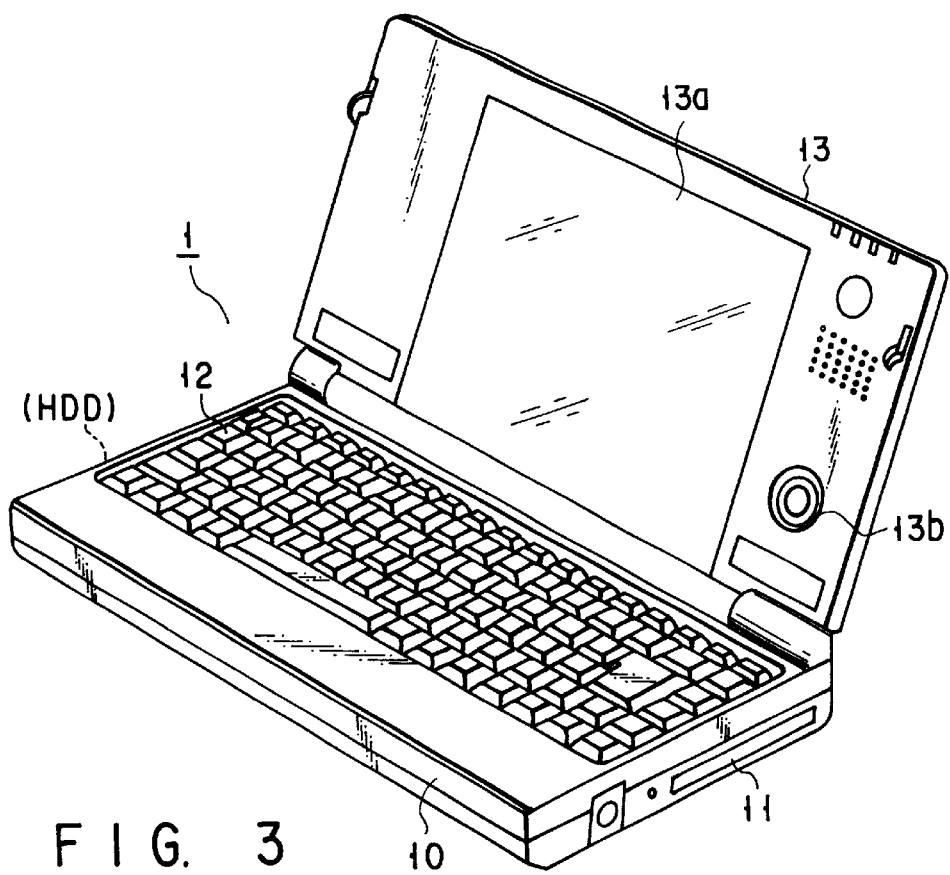
F I G. 3
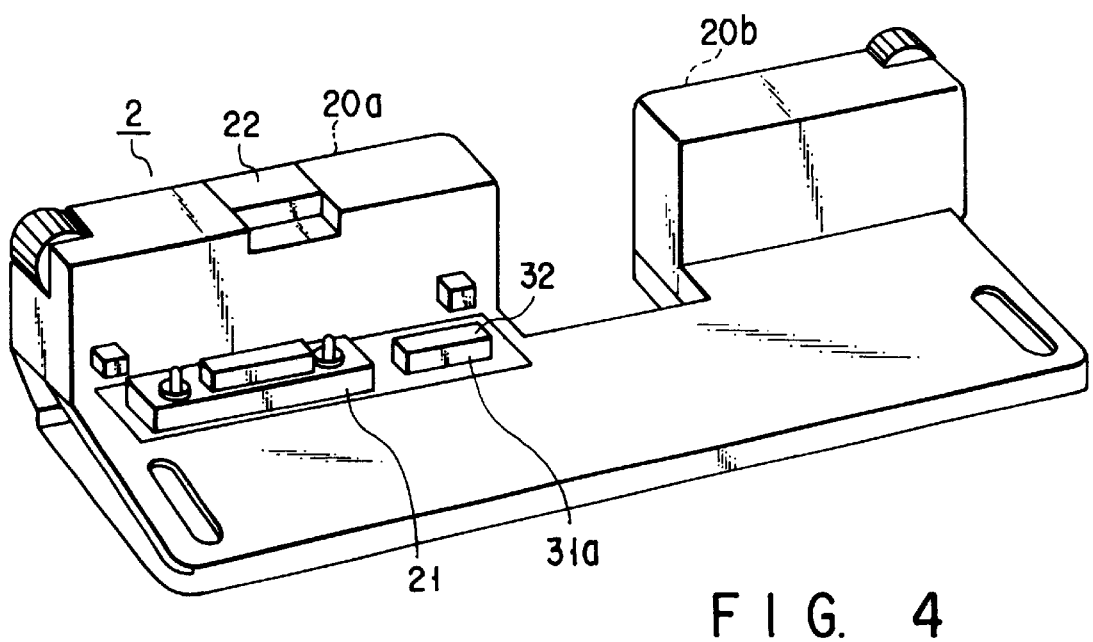
F I G. 4

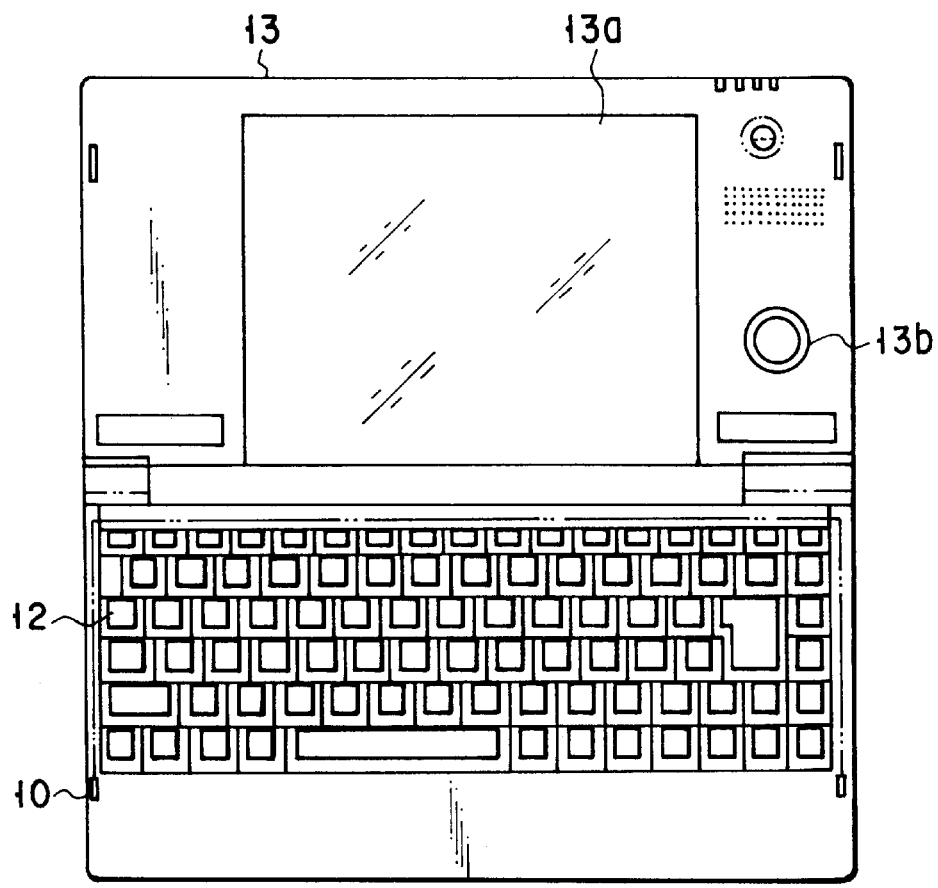
F I G. 5A
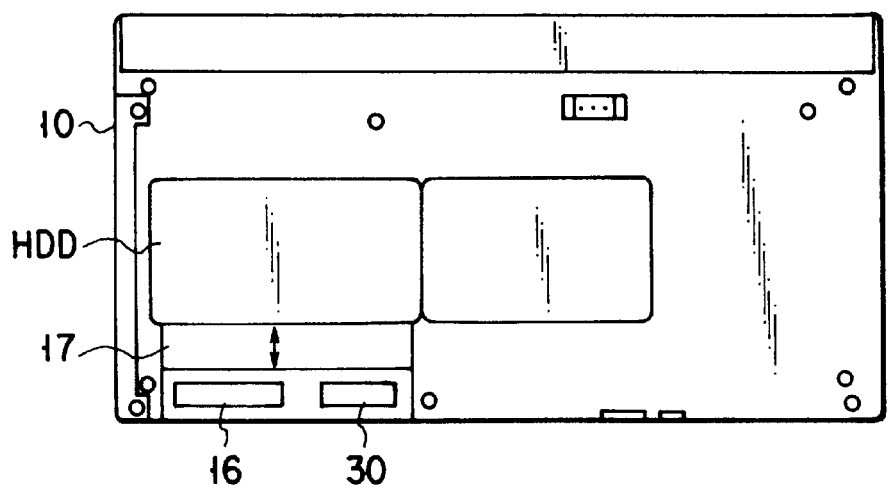
F I G. 5B

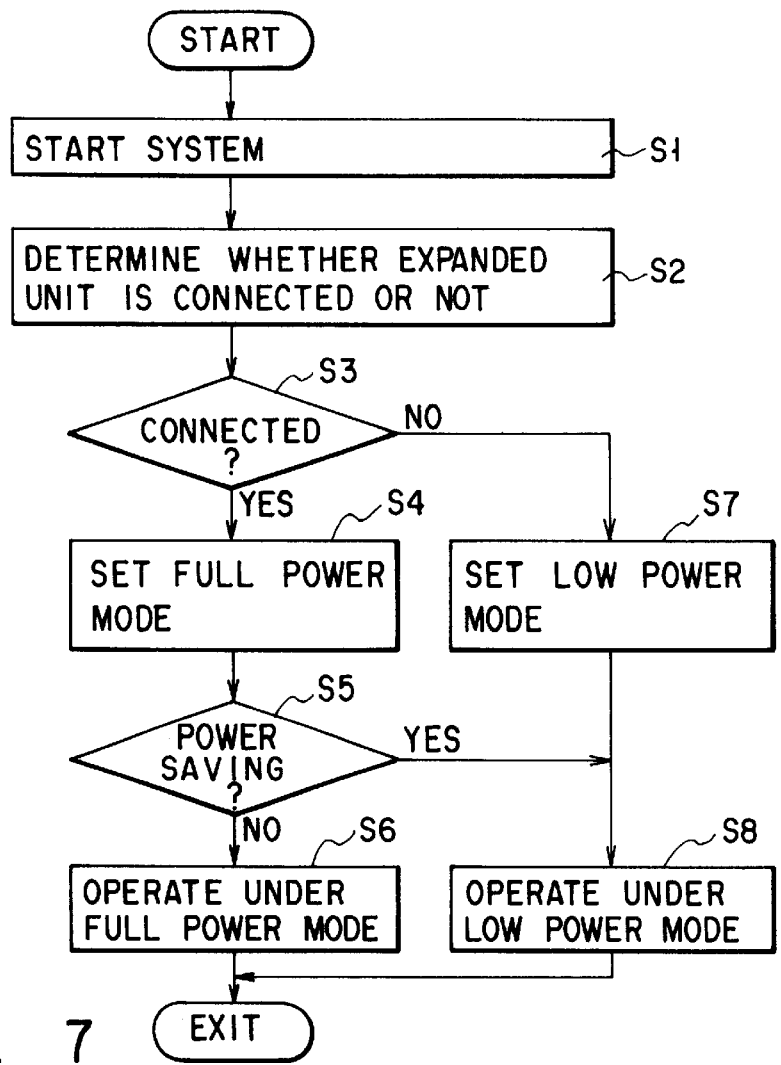
F I G. 7
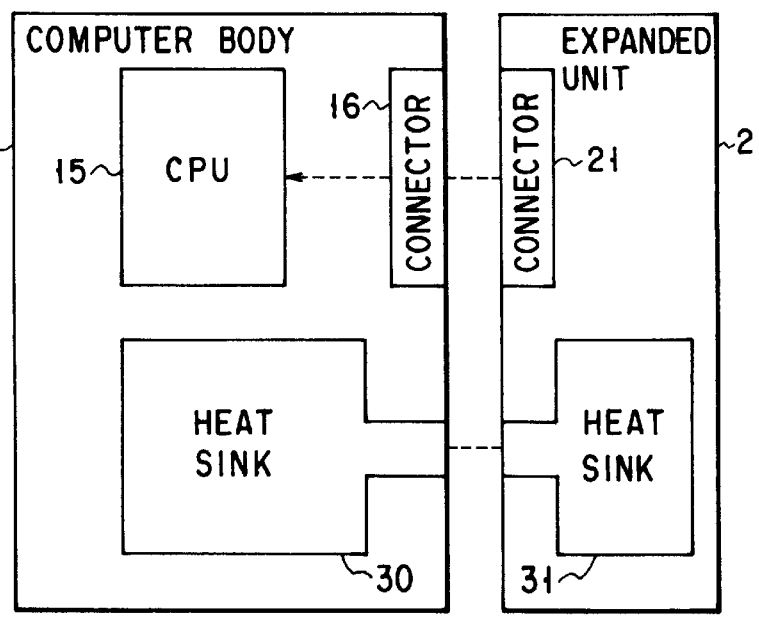
F I G. 8

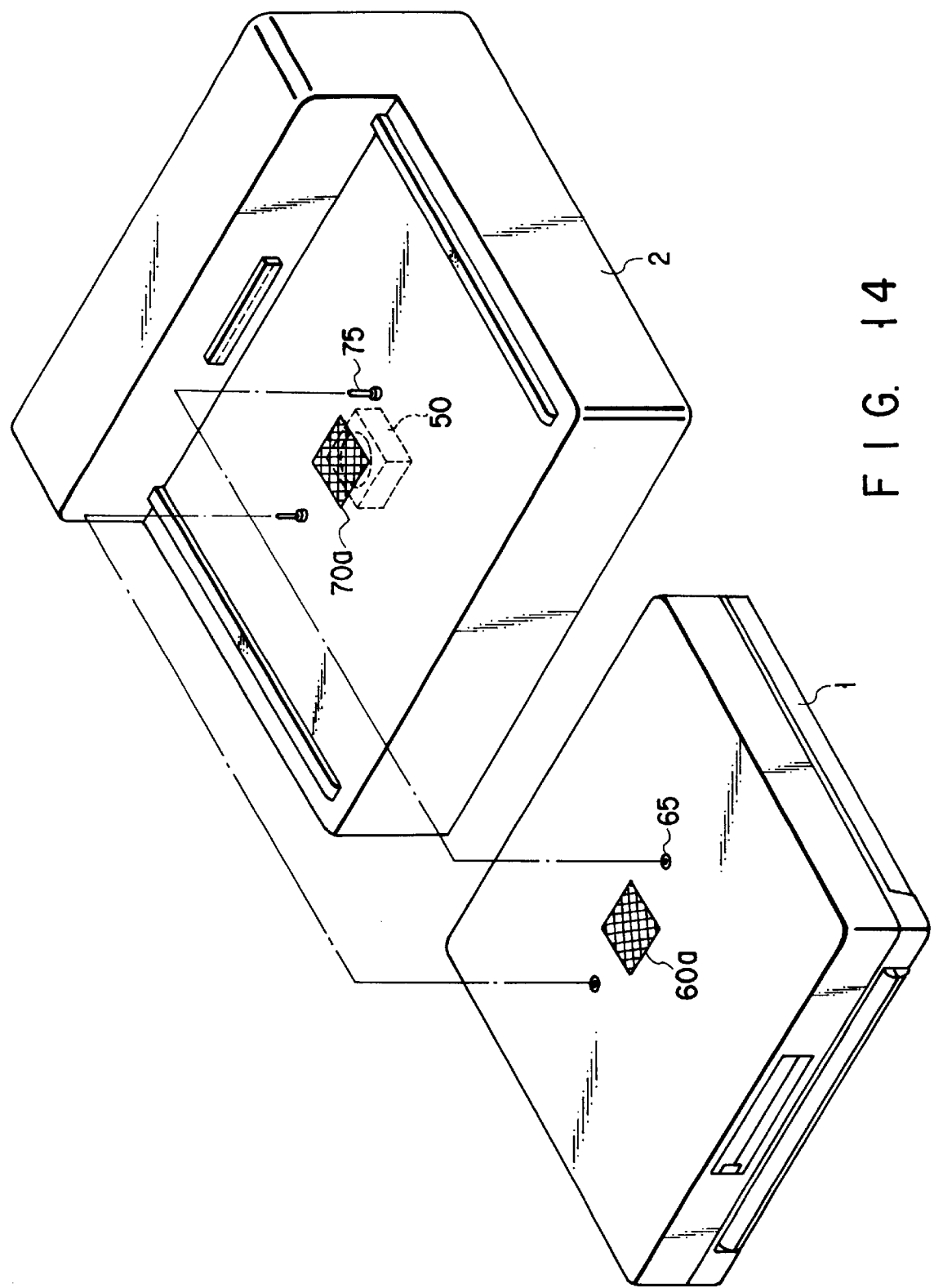
F I G. 14

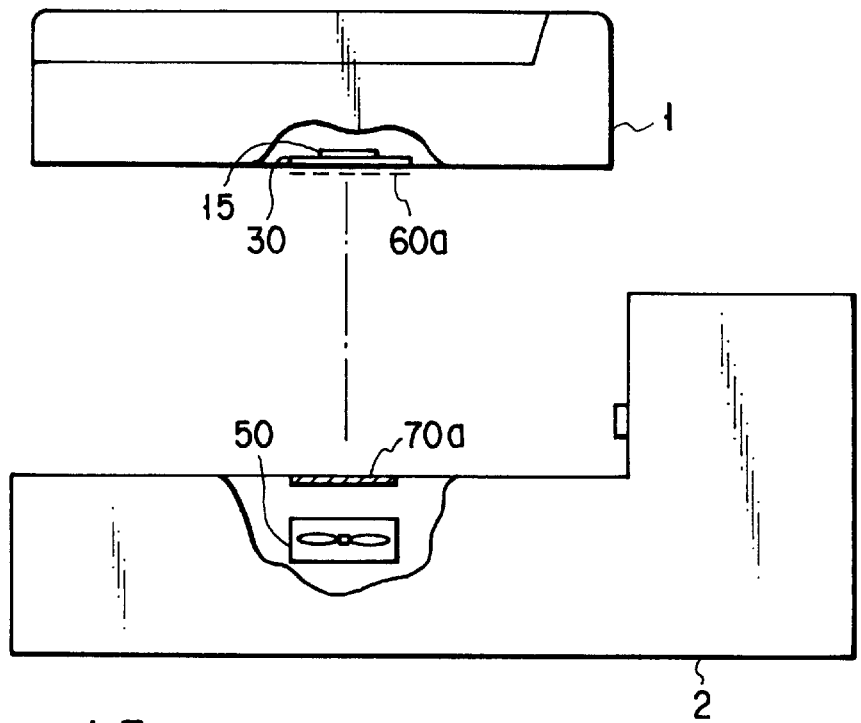
F I G. 15
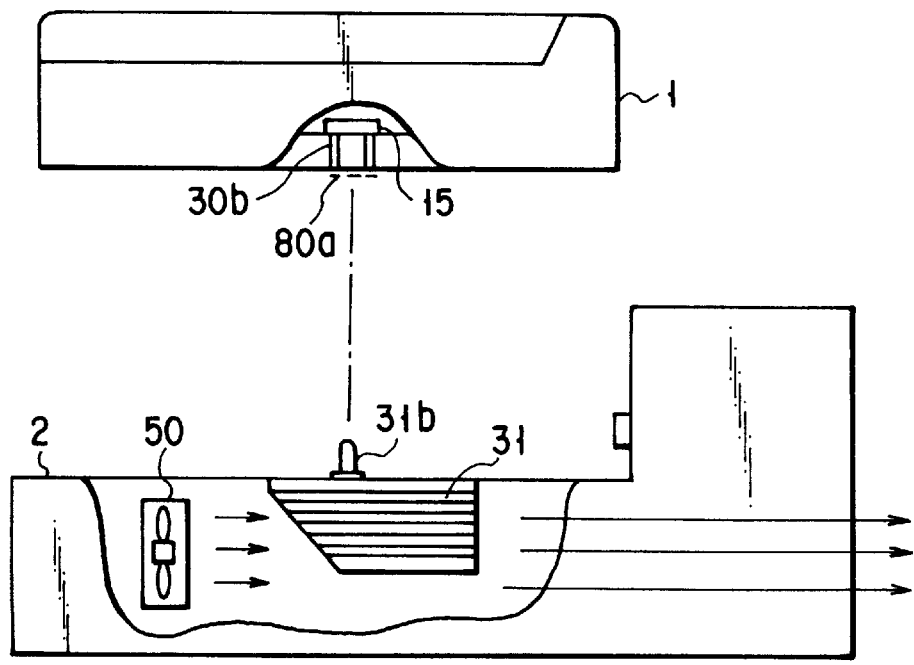
F I G. 17

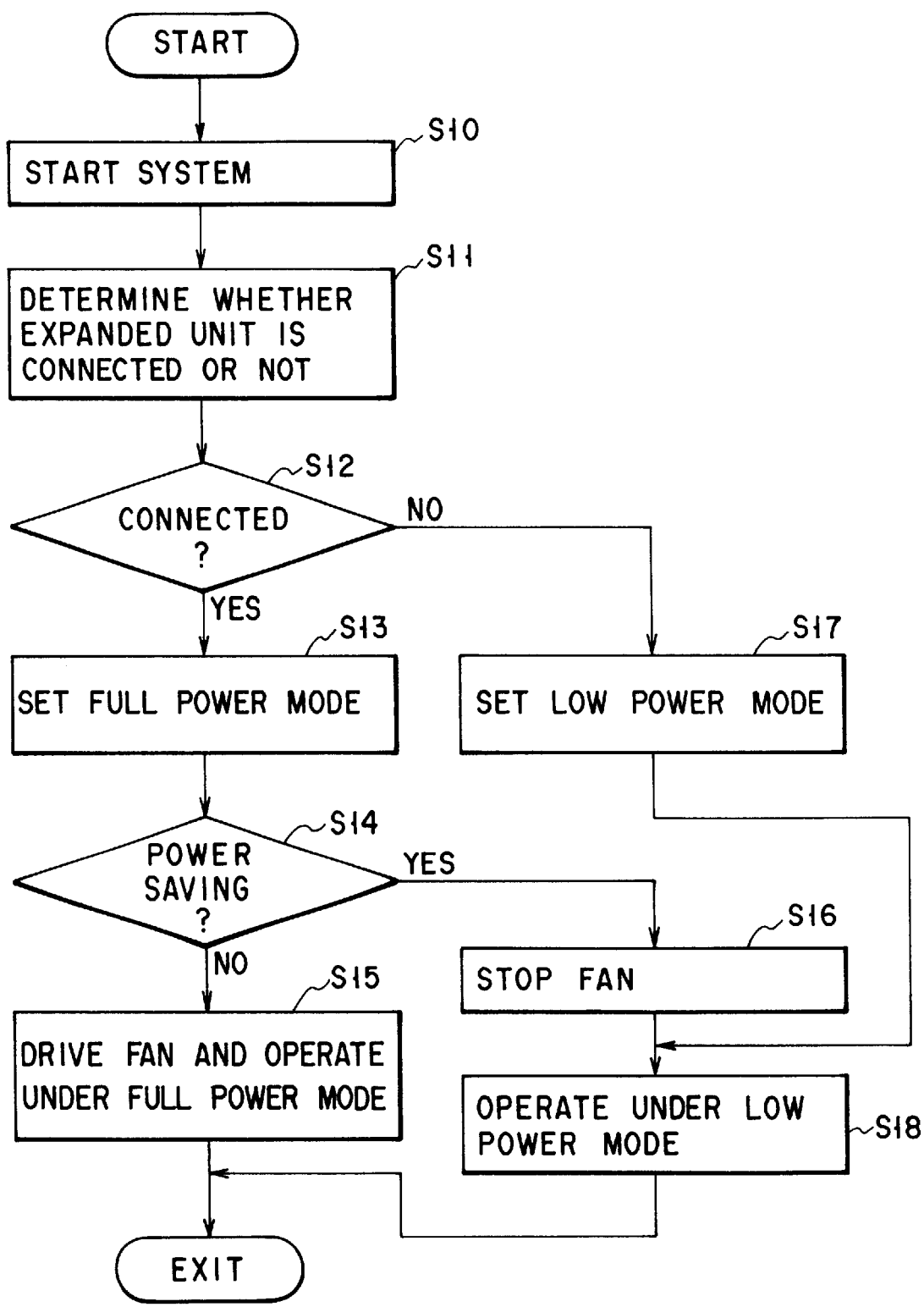
F I G. 18

APPARATUS FOR RADIATING HEAT FOR USE IN COMPUTER SYSTEM

BACKGROUND OF THE INVENTION

The present invention relates to a computer system, being applied to a personal computer capable of using an expanded unit, having a radiator for radiating heat of an interior of a computer main body.

In recent years, a portable small-sized personal computer has been developed as a data processor for a personal digital assistants (PDA) having multi-functions such as a communication function.

In addition to the miniaturization of the entire apparatus, improvement of calculation processing ability and various peripheral functions have been made in such a portable small-sized personal computer. Particularly, there has been developed a computer system, using an expanded unit (or an optional unit), which is called "docking station" or "port replicater", for expanding data processing function of the main body of the computer.

On the other hand, in the portable small-sized personal computer, since it is necessary to drive the computer by a built-in battery other than AC commercial power source, a saving of consumption power is required. Due to this, various kinds of saving systems are developed. In the recent small-sized personal computer, the saving of consumption power tends to be increased in accordance with the high performance and multi-function.

Generally, if the calculation processing ability of CPU is increased, the amount of heat in the computer is increased. As a result, an effective radiation mechanism is needed. As the radiation mechanism, a cooling fan and a heat sink are known. The heat sink is formed in the vicinity of a circuit board on which circuit elements such a CPU are mounted.

In the portable small-sized personal computer, it is difficult to ensure a space enough to provide the radiation mechanism other than the structural elements such as a circuit board in the housing body. Particularly, in a thin typed (notebook typed) small-sized personal computer, it is impossible to provide the cooling fan in view of the structure. Moreover, in the case of the radiation mechanism using the heat sink, since the surface area of the heat sink is limited, the radiation effect cannot be efficiently obtained.

Thus, in recent years, particularly, in the portable small-sized personal computer, there is a tendency that consumption power is increased in accordance with the multi-function and improvement of the calculation processing ability of CPU. On the other hand, it is difficult to provide the radiation mechanism for obtaining a sufficient radiation effect in order to miniaturize the main body of the apparatus.

If the radiation effect of the computer main body is insufficient, the processing ability of the computer main body cannot be performed at its maximum. Due to this, in the conventional case, for operating the circuit element, e.g., CPU, of the computer main body by the operation clock, the operation of the circuit element is limited as follows:

More specifically, the circuit element is operated for short time by a high speed operation clock. Or, the circuit element is operated for long time by a low speed operation. As a result, the performance of the computer system can be lowered than the performance, which is based on the design specification.

BRIEF SUMMARY OF THE INVENTION

An object of the present invention is to provide a small-sized computer system in which an expanded unit is used to miniaturize the entire body of the device and improve the radiation effect of a computer main body in the computer system using the expanded unit.

According to the present invention, there is provided a computer system comprising:

an expanded unit, having a structure to be detachable from a computer main body, connected to the computer main body to realize a predetermined expanded function;

first radiator material, provided in the computer main body, for radiating an interior of the computer main body;

second radiator material, provided in the expanded unit, for radiating the interior of the computer main body; and connecting means for connecting the first and second radiator material to each other when the expanded unit is inserted to the computer main body.

According to the above-mentioned computer system, the first and second material are connected to each other by use of the expanded unit, so that the surface area of the radiator material of the computer main body can be increased. In miniaturizing the computer main body, the surface area of the first radiator material, which is built in the computer main body, is decreased. However, as a whole, the surface area of the radiator material of the computer main body can be increased. In other words, there can be realized the radiator material of the computer main body having the surface area which can obtain the sufficient radiation effect.

As a result, if the expanded unit is used, the sufficient radiation effect can be obtained, and the temperature rise of the computer main body due to high-speed operation of such as CPU can be controlled. Therefore, the long time operation of such as CPU at the relatively high speed operation clock can be executed, and the performance of the computer main body can be performed in accordance with the design specification (a normal power mode or a full power mode).

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing an outline of a computer main body according to the first embodiment of the present invention;

FIG. 4 is a view showing an outline of an expanded unit according to the first embodiment of the present invention;

FIG. 5A is a view showing the computer main body according to the first embodiment of the present invention;

FIG. 5B is a view showing the computer main body according to the first embodiment of the present invention;

FIG. 7 is a flow chart according to a second embodiment of the present invention;

FIG. 8 is a block diagram of a computer system according to the second embodiment of the present invention;

FIGS. 14 and 15 are views showing a modification of the third embodiment;

FIGS. 16 and 17 are views showing a modification of the fourth embodiment; and

FIG. 18 is a flow chart according to a fifth embodiment off the present invention.

DETAILED DESCRIPTION OF THE INVENTION

Figure 1:
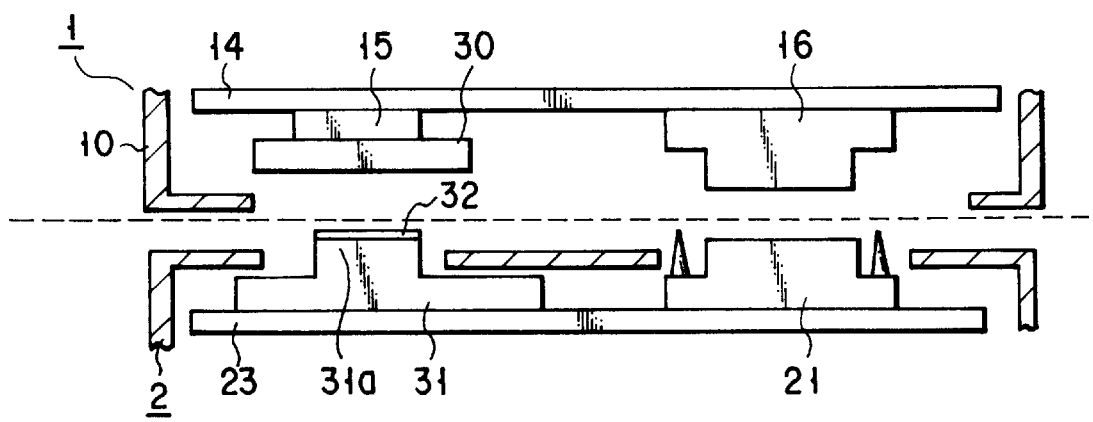
FIG. 1 is a view showing a main part of a computer system according to a first embodiment of the present invention.

Embodiments of the present invention will now be described with reference to the accompanying drawings. (First embodiment) As shown in FIGS. 3 and 4, it is assumed that the computer system of this embodiment has a portable (notebook type) small-sized personal computer as a computer main body 1, and an expanded unit 2 as an optional device. The computer main body 1 has a circuit board on which various kinds of circuits are mounted, a hard disk drive (HDD), and a slot 11 for a PC card (IC card based on PCMCIA) in a housing 10. Moreover, the computer main body 1 has a keyboard 12 mounted on the housing 10, a display device 13 attached to the housing 10 to be openable. The display device 13 has a pointing device 13b other than a liquid display panel 13a.

The expanded unit 2, which is called "docking station" or "port replicater", has the structure to be detachable from the computer main body 1. The expanded unit 2 is used as an interface device for various kinds of expanding function devices. As shown in FIG. 4, the expanded unit 2 has connectors 20a and (20b (FIG. 6A) corresponding to an interface specification of the expanded function devices such as a mouse, a printer, etc. Moreover, the expanded unit 2 has a connecter (unit side connector) 21 for connecting the unit 2 to the computer main body 1, and a lever 22 for disconnecting the unit 2 from the computer main body 1.

(Radiation Mechanism)

According to the computer system of this embodiment, a heat sink is provided to each of the computer main body 1 and the expanded unit 2. As shown in FIG. 1, the computer main body 1 has a heat sink 30, and a connector (main body side connector) 16 for expansion in its housing 10. In this case, FIG. 1 is a side view of the portion where the computer main body 1 of FIGS. 3 and 4 and the expanded unit 2 are connected to each other, showing the relationship between the computer main body 1, which is positioned at the upper side, and the expanded unit 2, which is positioned at the lower side.

The heat sink 30, which is positioned in the vicinity of the circuit element (heat source) such as a CPU mounted on the circuit board 14, is a radiation member. As shown in FIG. 5B, the heat sink 30 and the main body side connector 16 are connectable to the outer unit (expanded unit 2) by an openable slide 17, which is formed on a bottom surface of the housing 10. In other words, if the slide 17 is closed, the heat sink 30 and the connector 16 are contained in the housing 10, so that they can not be connected to each other. FIG. 5A is a view of the computer main body 1 seeing from the upper side. FIG. 5B is a view showing the bottom surface of the housing 10 when the keyboard 12 is positioned at the upper surface.

As shown in FIG. 1, the expanded unit 2 has a heat sink 31, which is mounted on a built-in circuit board 23, and a unit side connector 21. The heat sink 31 is positioned in the vicinity of the unit side connector 21, so that a top end portion 31a is projected to contact the outer unit. Moreover, an interpose member 32 having a good thermal conductive property is formed on the top end portion 31a. The interpose member 32 is made of rubber material, which is called cool sheet. As shown in FIG. 4, the top end portion 31a of the heat sink 31 is positioned in the vicinity of the unit side connector 21 so as to be connectable to the heat sink 30 of the computer main body 1.

Figure 6A:
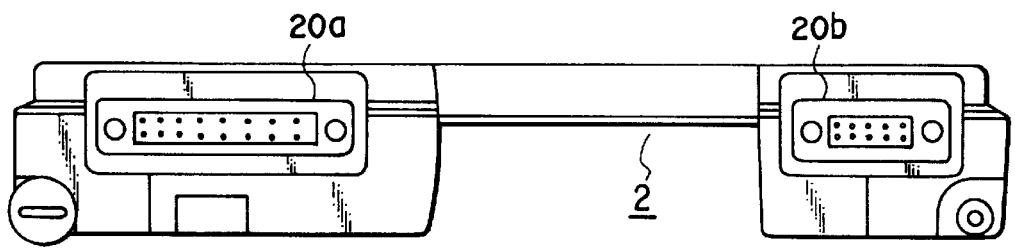
FIGS. 6A to 6C are views showing the expanded unit according to the first embodiment of the present invention.
Figure 6B:
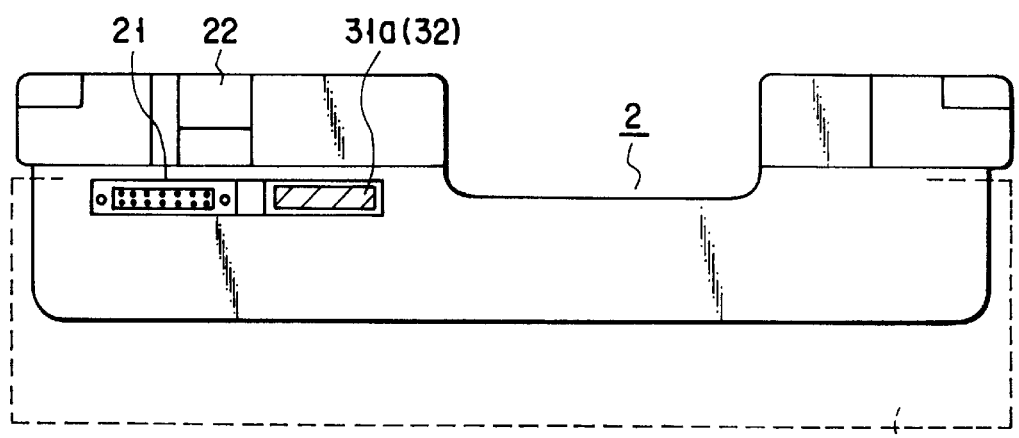
Figure 6C:
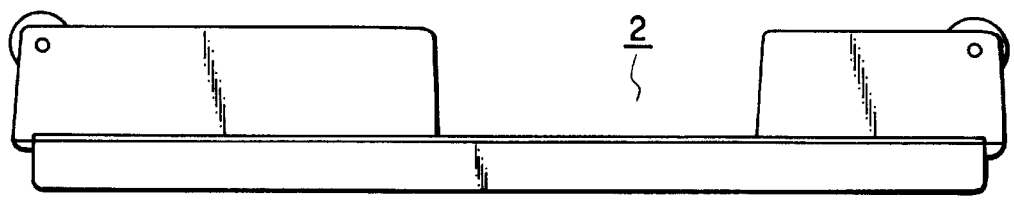

FIG. 6A is a back view of the expanded unit 2 showing the arrangement of connectors 20a and 20b corresponding to the interface specification of the expanded device. FIG. 6B is a view showing the arrangement of the unit side connector 21 and the heat sink 31, seeing from the upper side. FIG. 6C is a view of the expanded unit 2, seeing from the front.

(Operation of System)

The computer system of this embodiment, it is assumed that the expanded unit 2 is attached to the computer main body 1. More specifically, the expanded unit 2 of FIG. 4 is positioned at the lower side, and the computer main body is positioned from the upper side. As shown in FIG. 5B, the slide 17, which is formed on the bottom surface of the computer main body 1, is opened such that each of the connector 16 and the heat sink 30 can be connected to the outer unit.

As shown in FIG. 1, the connector 16 is engaged with the connector 21 formed in the expanded unit 2. By the connection between the connectors 16 and 21, the computer main body 1 is connected to the expanded unit 2. As a result, the computer main body 1 can be connected to the expanded function devices such as the mouse connected to the connectors 20 and 21 for interface, and the printer. In other words, the computer main body 1 can use the expanded function devices such as the mouse and the printer through the expanded unit 2.

According to this embodiment, when the computer main body 1 is connected to the expanded unit 2 by the connection between the connectors 16 and 21, the heat sink 30 formed in the computer main body 1 is connected to the heat sink 31 formed in the expanded unit 2, as shown in FIG. 1. More specifically, the top end portion of the heat sink 30 is connected to the heat sink 31 through the interpose member 32 formed on the top end portion 31a of the heat sink 31. The interpose member 32 is provided to enlarge a contact area when the heat sink 30 contacts the heat sink 31, and to improve thermal conductivity.

Thus, when the expanded unit 2 is connected to the computer main body 1, the connectors 16 and 21 are connected, and the heat sink 30 of the computer main body 1 and the heat sink 31 of the expanded unit 2 come in contact with each other to be connected. As a result, the heat sink of the computer main body 1 has a surface area in which the surface area of the heat sink 30 and that of the heat sink 31 are combined with each other. Due to this, as compared with the case of the single sink 30, the radiation effect can be improved. More specifically, when the circuit 15 such as CPU is operated as a heat source, not only the heat sink 30 of the computer main body 1 but also the heat sink 31 of the expanded unit 2 functions to be radiated. As a result, when the expanded unit 2 is connected to the computer main body 1, the heat sink 31 of the expanded unit 2 is also used, so that a sufficient radiation effect can be obtained. The computer main body 1 can be operated in a normal power mode (including a full power mode), so that a high speed calculation processing can be executed.

As the expanded unit 2, there may be used an optional unit, which is dedicated to expand the radiation function with only the built-in heat sink 31.

(Modification of First Embodiment)

Figure 2:
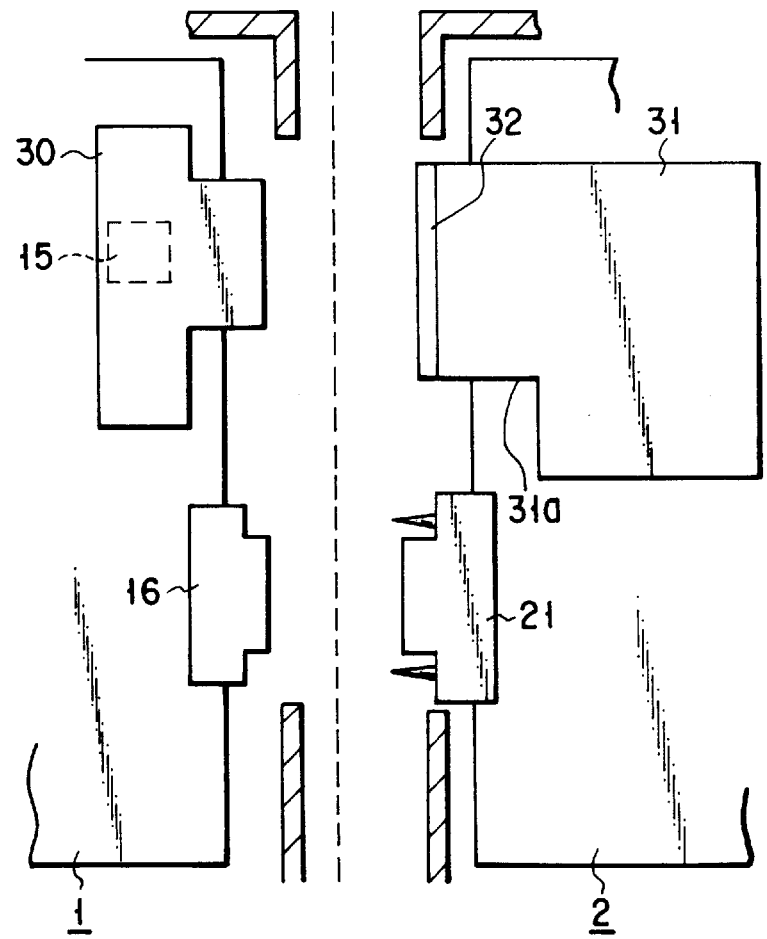
FIG. 2 is a view showing a main part of a computer system according to a modification of the first embodiment of the present invention.

FIG. 2 is a view showing a modification of the first embodiment. In the first embodiment, it is assumed that the expanded unit 2 is positioned at a relative lower side, and the computer main body 1 is positioned at the upper side of the expanded unit 2. In this modification, it is assumed that the computer main body 1 and the expanded unit 2 are connected to each other at their side surface portions. More specifically, the heat sink 30 of the computer main body 1 and the connector 16 are arranged at the back surface side of the housing 10. Then, the heat sink 31 and the connector 21 are arranged on the side surface side of the expanded unit 2.

Even in the structure of this modification, when the computer main body 1 is connected to the expanded unit 2 through the connectors 16 and 21, the heat sink 30 of the computer main body 1 and the heat sink 31 of the expanded unit 2 are contacted each other to be connected to each other. As a result, similar to the first embodiment, the computer main body 1 can be high radiation effect.

(Second Embodiment)

FIG. 7 is a flow chart according to a second embodiment of the present invention, and FIG. 8 is a block diagram of the computer system according to the second embodiment of the present invention. The system of this embodiment is estimated that the CPU 15 of the computer main body 1 has a function of selecting a full power mode or a low power mode depending on whether or not the expanded unit 2 is used.

As shown in the flow chart of FIG. 7, the CPU 15 determines whether or not the expanded unit 2 is connected to the computer main body 1 when the system is started (steps S1, S2). There may used the well known methods such as a method for inputting a control signal from the expanded unit 2 and a method in which CPU 15 accesses the expanded unit 2.

When the expanded unit 2 is connected to the computer main body 1, the CPU 15 sets the full power mode (steps S3, S4). The full power mode is an operation mode in which the operation can be executed at the maximum consumption power of the power specification of the system. In other words, the CPU 15 is in the operation mode in which the high speed calculation processing can be performed at the high speed clock. In this case, if power saving is set by the designation from the battery drive mode or the user, the CPU 15 executes the operation in the low power mode (YES of step S5, S8). The low power mode is an operation mode in which the calculation processing can be performed at the clock whose frequency is lower than the maximum specification.

When the expanded unit 2 is connected to the computer main body 1, the heat sink 30 of the computer main body 1 and the heat sink 31 of the expanded unit 2 are connected to each other. As a result, the computer main body 1 can obtain the high radiation effect, and the CPU 15 can execute the operation in the full power mode (step S6).

On the other hand, when the expanded unit 2 is not connected to the computer main body 1, that is, the computer main body 1 singly operates, the CPU 15 limits the operation such as the high speed calculation processing due to the full power mode. As a result, the CPU 15 sets the low power mode (NO of step S3, step S7). In other words, the CPU 15 operates at a low speed at the clock whose frequency is lower than the maximum specification (step S8). Since the radiation effect only by the heat sink 30 can be obtained from only the computer main body 1, a sufficient radiation effect cannot be always obtained in the operation state due to the full power mode. For this reason, the operation due to the full power mode is limited, thereby making it possible to prevent an unexpected state such as a system down from being generated.

Thus, the expanded unit 2 with the built-in heat sink 31 within and the computer main body 1 are connected to each other, so that the radiation effect can be improved by the heat sink of the computer main body 1. Therefore, in using the expanded unit 2, it is possible to set the operation state in the full power mode in which the sufficient radiation effect is estimated. Conversely, when the expanded unit 2 is not used, there is set the operation mode in which the radiation effect only the heat sink of the computer main body 1 is estimated. In other words, by setting the low power mode in which the operation in the full power mode is limited, there can be realized the operation of the CPU, which is adapted to the radiation effect. As the expanded unit 2, there may be used an optional unit, which is dedicated to expand the radiation function with only the built-in heat sink 31.

Thus, in the computer system in which the expanded unit with the built-in radiation member and the computer main body are connectable to each other, the radiation effect of the computer main body can be improved. Particularly, when the present invention is applied to the portable small-sized personal computer, the radiation effect for the entire system including the expanded unit can be increased even if the radiation effect due to the radiation member of only the computer main body is insufficient. Thereby, even if there is a limitation in the radiation effect of the computer main body as a result of miniaturizing the computer main body, the radiation effect for the entire system can be improved, consumption power can be increased as much as possible, and the processing ability of the computer system can be performed at its maximum.

(Third Embodiment)

Figure 9:
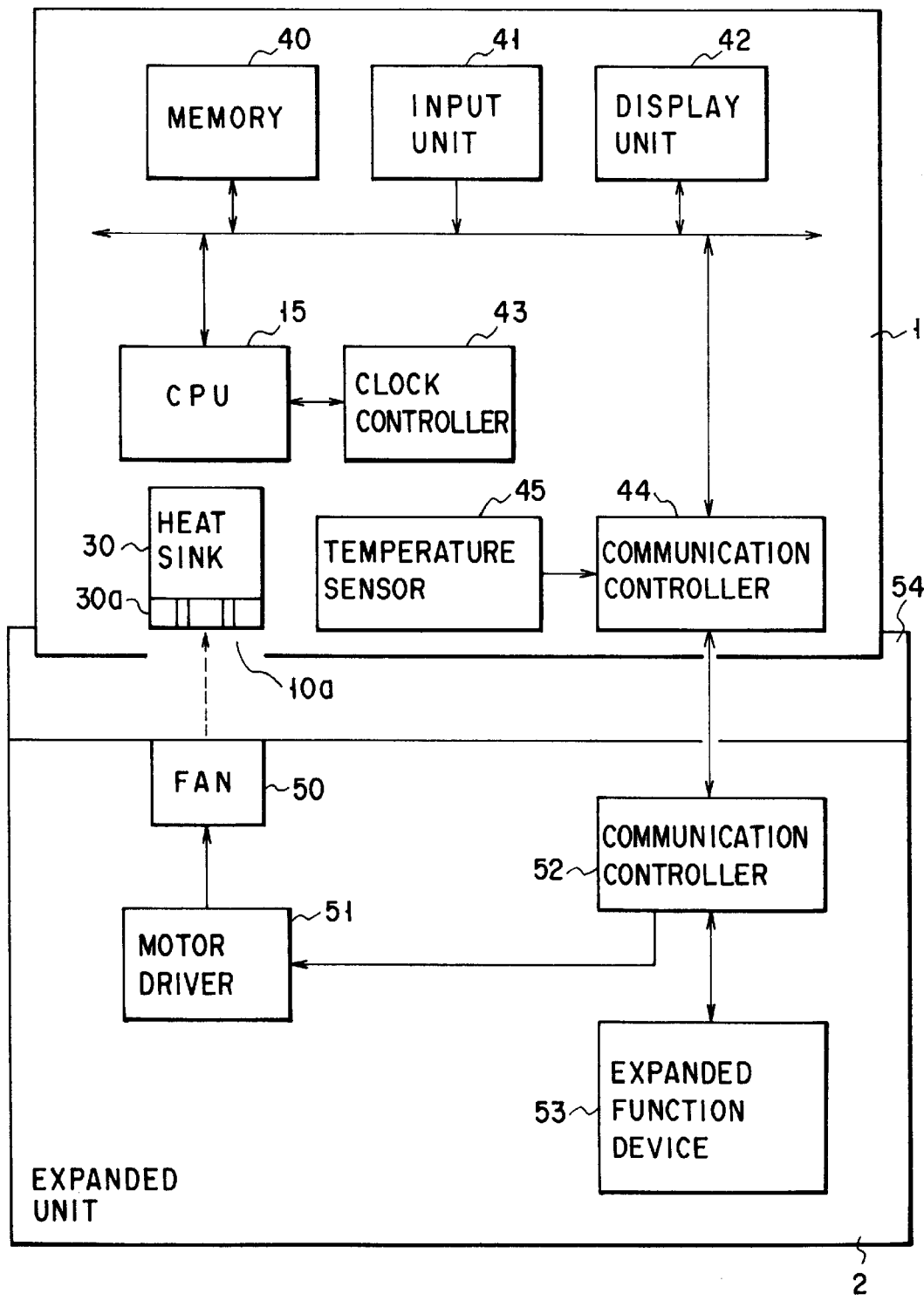
FIG. 9 is a block diagram of a computer system according to a third embodiment of the present invention.

FIG. 9 is a block diagram of a computer system according to a third embodiment of the present invention.

In this embodiment, the computer main body 1 comprises a memory 40, an input unit 41, a display unit 42, a clock controller 43, a communication controller 44, and a temperature sensor 45 other than CPU 15.

The clock controller 43 is a circuit for controlling the supply of an operation clock to CPU 15. The communication controller 44 is connected to a communication controller 52 of the expanded unit 2 to perform a communication between data and a command. The temperature sensor 45 is a sensor for detecting mainly ambient temperature of CPU 15. The sensor 45 outputs a detection signal when the temperature exceeds a predetermined reference value.

The computer main body 1 further comprises a heat sink 30 for radiation. The heat sink 30 has a radiation fin at a top end portion 30a to enlarge a surface area for radiation. The heat sink 30 is placed such that the top end portion 30a is formed in the vicinity of the opening portion 10a formed on the part of the side surface portion of the housing of the computer main body 1.

The expanded unit 2 has a docking mechanism 54 for combining the expanded unit 2 with the computer main body 1 at a predetermined position, a lock mechanism for locking the combination of the expanded unit 2 and the computer main body 1, and a circuit connection mechanism for connecting to the computer main body 1 including the expanded connector. Moreover, the expanded unit 2 comprises the communication controller 52 for performing data and command communication between the communication controllers 44 and 52, an expanded function device 53, a cooling fan 50, a motor driver 51 for driving the motor of the fan 50.

The communication controller 52 has a function of receiving the temperature detection signal output from the temperature sensor 45 of the computer main body 1 to be transferred to the motor driver 51. The motor driver 51 has a function of controlling the drive of the cooling fan 50 based on the temperature detection signal. The cooling fan 50 is provided at the position opposite to the opening portion 10a formed on the housing of the combined computer main body 1. In other words, when the cooling fan 50 is driven by the motor driver 51, air for cooling is directly sent to the top end portion 30a of the heat sink 30 through the opening portion 10a.

Figure 10:
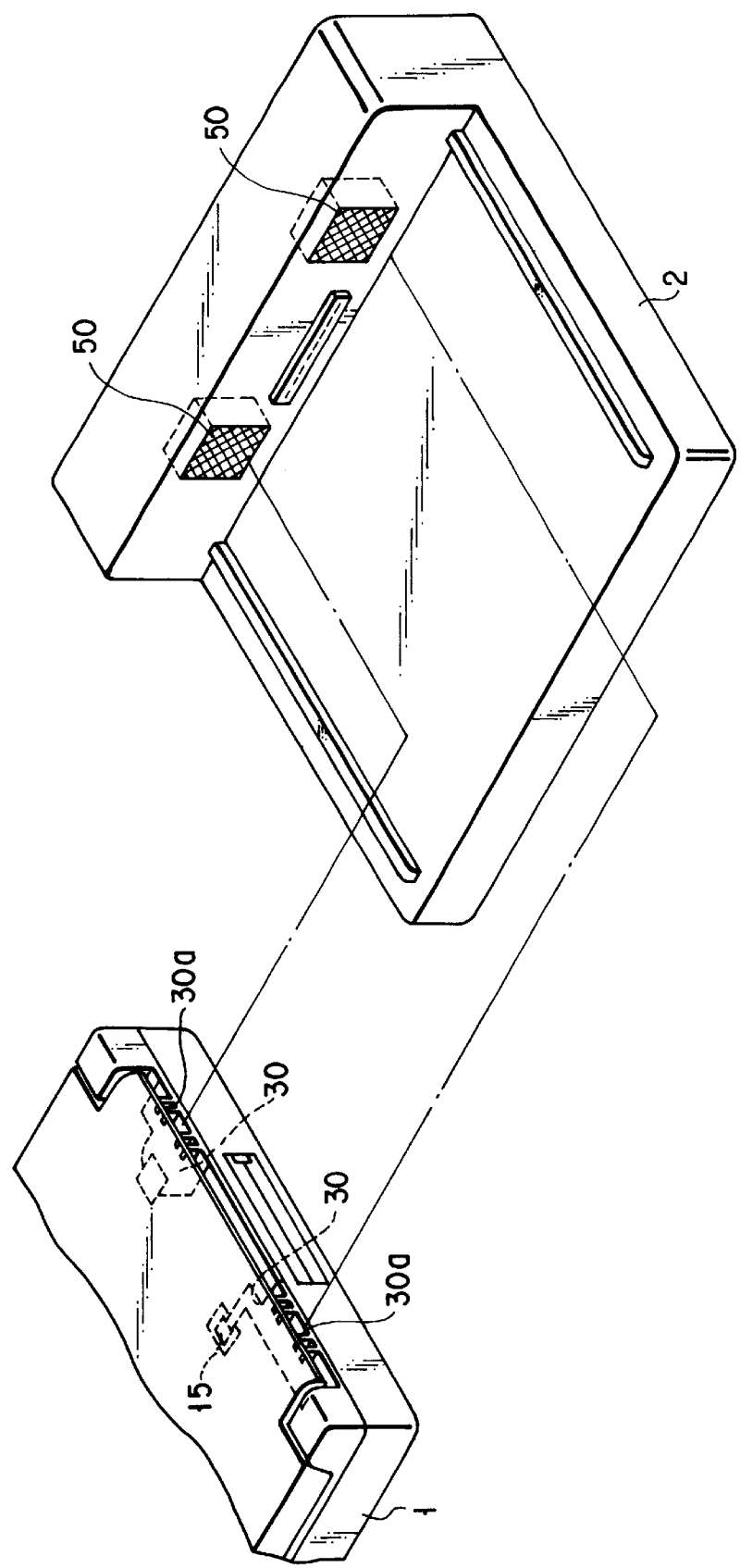
FIG. 10 is a view showing an outline of an expanded unit according to the third embodiment of the present invention.
Figure 11:
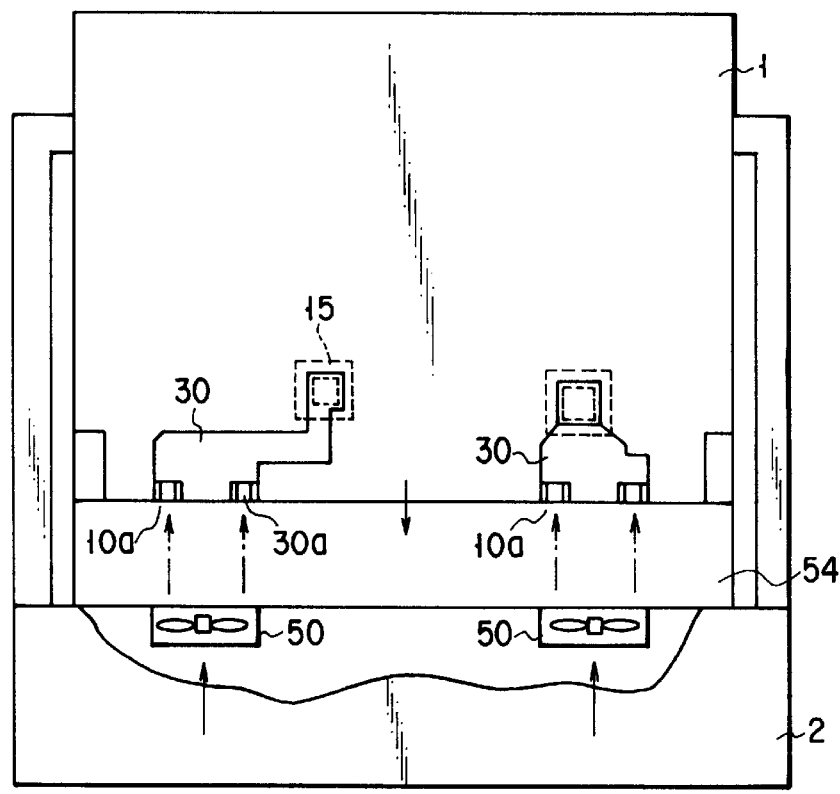
FIG. 11 is a view showing a modification of the third embodiment of the present invention.

FIG. 10 is a view showing the outline of the expanded unit 2. In this case, the expanded unit 2 has two cooling fans 50 built-in. As shown in FIG. 11, the top end portions 30a of two heat sinks 30 are formed in the vicinity of the opening portions 10a formed at two portions of the housing, respectively.

(Operation of System)

In the system of this embodiment, it is assumed that the computer main body 1 and the expanded unit 2 are combined at a predetermined position as shown in FIGS. 9 to 11. The computer main body 1 is formed such that the cooling fans 50 provided in the expanded unit 2 are positioned to be opposite to the top end portions 30a (where radiation fin is formed) of the heat sinks 30 arranged in the vicinity of the opening portions 10a of the housing.

In the computer main body 1, the CPU 15 is operated by the operation clock supplied from the clock controller 43. In this case, the CPU 15 is operated at speed in accordance with the frequency of the operational clock. The amount of heat is changed in accordance with the frequency of the operational clock, and the ambient temperature of CPU 15 is varied. The heat sinks 30 of the computer main body 1 radiate the heat of the CPU 15 by the radiation function so that the rise of the ambient temperature can be prevented.

If the CPU 15 is operated in the full power mode (operation at the maximum frequency of the operational clock), there is possibility that the rise of the ambient temperature will not be sufficiently prevented by the radiation effect of the heat sinks 30 of the computer main body 1. To solve this problem, according to the present invention, the temperature sensor 45 monitors the ambient temperature of the heat source, particularly, CPU 15. Then, when the ambient temperature exceeds a predetermined reference value, the sensor 45 outputs a temperature detection signal.

In the expanded unit 2, when the temperature detection signal is received from the temperature sensor 45 through the communication controller 52, the motor driver 51 drives the cooling fans 50. The cooling fans 50 send cool air to the top end portions 30a of the heat sinks 30 through the opening portions 10a. As a result, the radiation effect of the heat sinks 30 can be improved, and the ambient temperature of, particularly, CPU 15 can be prevented from being increased.

In this case, the temperature sensor 45 may be structured to output a temperature detection signal, which shows a temperature rise every predetermined level, in accordance with the temperature rise from the reference value. By this structure, in the expanded unit 2, the motor driver 51 can drive and control the cooling fans 50 to increase more wind supply in accordance with the ambient temperature of the computer main body.

Thus, cooling air is supplied to the interior of the computer main body 1 from the cooling fans 50 provided in the expanded unit 2. Thereby, the radiation effect of the computer main body 1 can be improved. In this case, the internal temperature of the computer main body 1 is monitored. Then, only when the temperature exceeds an allowable range, the cooling fans 50 provided in the expanded unit 2 are driven. Thereby, saving of consumption power can be effectively realized as compared with the method in which the cooling fans 50 are always driven.

On the other hand, in the system in which the cooling fans 50 are positively used, the number of heat sinks 30 is set to be necessary minimum. Thereby, the miniaturization of the computer main body 1 can be improved. By use of the expanded unit having such the radiation function, CPU 15 can be operated at high speed for a long time even if the size of the computer main body 1 is small. In this embodiment, there may be used a dedicated unit, which has the structural elements relating to only the radiation functions such as the cooling fans 50, the mode driver 51, and the communication controller 52, etc, as the expanded unit 2.

(Fourth Embodiment)

Figure 13:
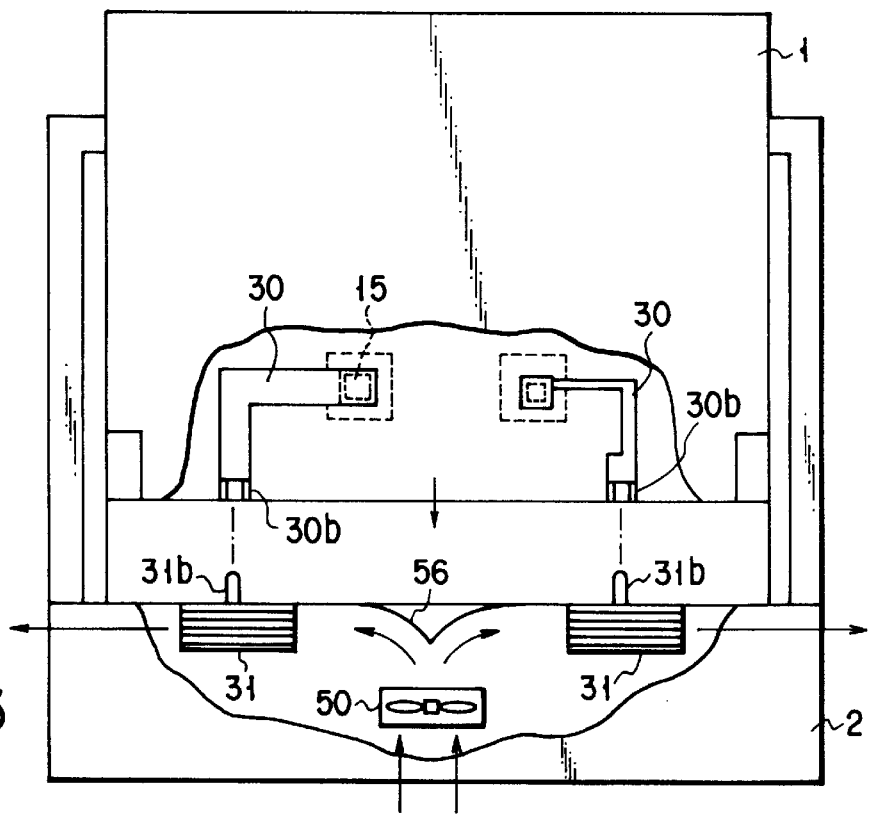
FIG. 13 is a block diagram of the computer system according to the fourth embodiment of the present invention.
Figure 12:
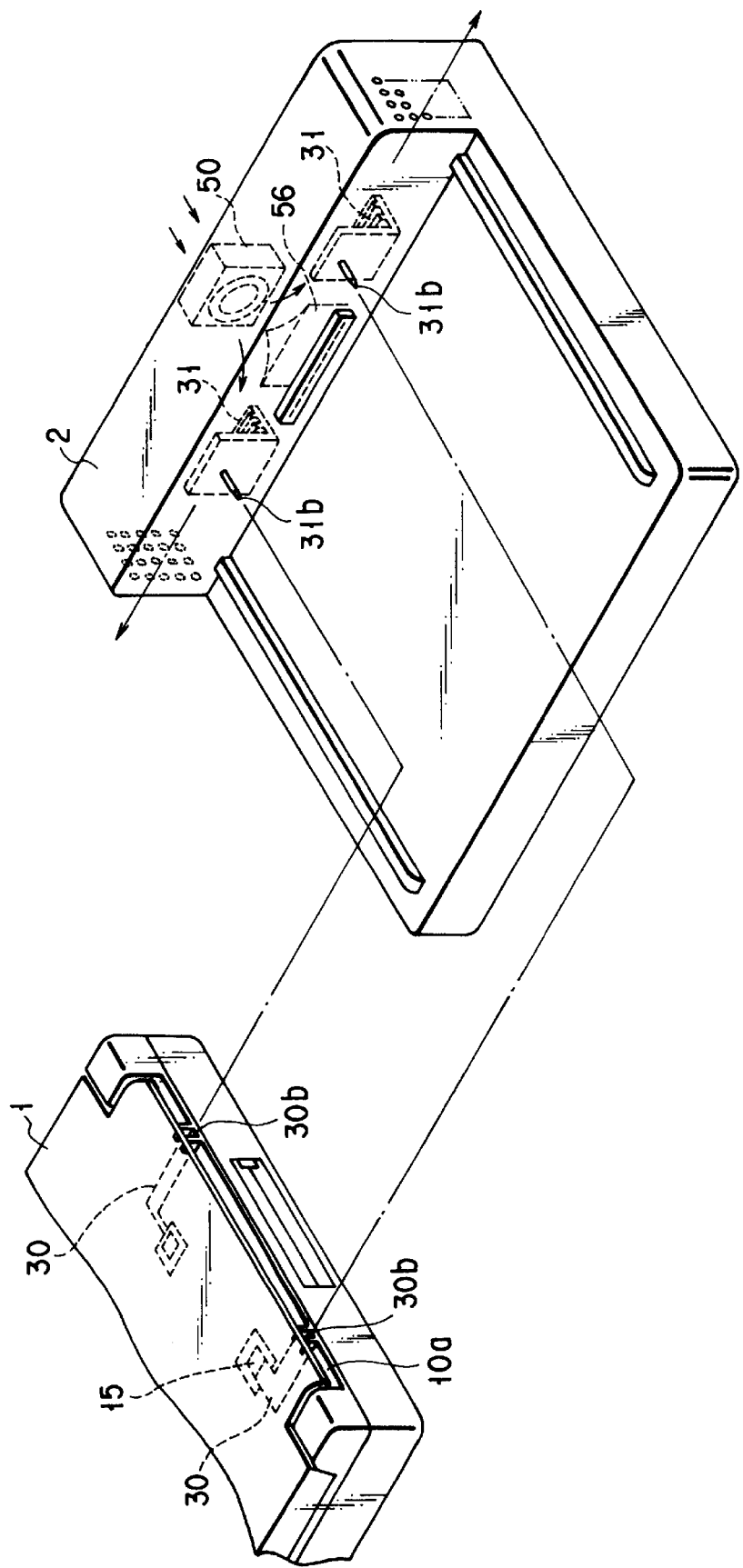
FIG. 12 is a view showing an outline of an expanded unit according to a fourth embodiment of the present invention.

FIG. 12 is a view showing the outline of the expanded unit according to a fourth embodiment of the present invention, and FIG. 13 is a block diagram of the computer system according to the fourth embodiment of the present invention. The expanded unit 2 of this embodiment has the cooling fan 50 and the heat sink 31. The top end portion of the heat sink 31 has a rod-shaped heat conductive member 31b. The heat conductive member 31b is engaged with the radiation fin provided on the top end portion 30b of the heat sink 30 such that the heat sink 30 and the heat sink 31 of the expanded unit 2 are connected to each other.

In the expanded unit 2, cool air is sent to the heat sink 31. The expanded unit 2 also has a guide plate for a wind direction. Then, cool air is sent to each heat sink 31 by the guide plate 56.

In the computer system of this embodiment, it is assumed that the computer main body 1 and the expanded unit 2 are combined at a predetermined position as shown in FIGS. 12 and 13. In other words, the top end portion 30b (where radiation fin is formed) of each heat sink 30, which is positioned in the vicinity of the opening 10a of the housing, and the rod-shaped conductive member 31b of the expanded unit 2 are engaged with each other. As a result, the heat sinks 30 of the computer main body 1 and the heat sinks 31 of the expanded unit 2 are connected to each other. By the above-mentioned structure, as explained in the first embodiment, the surface area of the heat sinks of the computer main body is equivalent to the combination of the surface area of the heat sinks 30 and that of the heat sinks 31.

In this embodiment, since the cooling fan 50 is structured to send cool air to the heat sinks 31, the heat sinks 31 radiate heat highly efficiently. Heat, which is generated when CPU 15 operates at speed corresponding to the frequency of the operation clock, is radiated to the heat conductive members 31b through the opening portions 10a of the housing by the heat sinks 30 of the computer main body 1. Moreover, heat of the computer main body 1 is discharged to the heat sinks 31 of the expanded unit 2 through the heat conductive member 31b. The heat sinks 31 are cooled by cool air from the fan 50, so that the heat sinks 31 radiate heat highly efficiently.

The cooling fan 50 is preferably driven and controlled by the method of the third embodiment. In other words, in the expanded unit 2, when the temperature detection signal is received from the temperature sensor 45 of the computer main body 1 through the communication controller 52, the motor driver 51 drives the cooling fan 50. Thereby, saving of consumption power can be effectively realized as compared with the method in which the cooling fans 50 are always driven.

Thus, according to the system of this embodiment, the heat sinks 31 of the expanded unit 2 and the heat sinks 30 of the computer main body 1 are connected to each other so as to improve radiation effect. Also, the heat sinks 31 can be cooled by cool air from the cooling fan 50 of the expanded unit 2. As a result, the radiation effect of the computer main body 1 can be improved.

By use of the expanded unit having such the radiation function, CPU 15 can be operated at high speed for a long time even if the size of the computer main body 1 is small. In this embodiment, there may be used a dedicated unit (an optional unit), which has the structural elements relating to only the radiation functions such as the heat sinks 31, the heat conductive member 31b, and the cooling fan 50, etc, as the expanded unit 2.

(Modification of Third Embodiment)

FIGS. 14 and 15 are views showing a modification of the third embodiment.

As shown in FIG. 14, a vent 60a for cooling is provided on a bottom surface portion of the computer main body 1. As shown in FIG. 15, the computer main body 1 is structured such that the heat sink 30 is provided in the vicinity of the vent 60a. The expanded unit 2 has a vent 70a for blowing at the position opposite to the vent 60a when the unit 2 is combined with the computer main body 1. Moreover, the unit 2 is structured such that the cooling fan 50 is provided in the vicinity of the vent 70a.

In this modification, holes 65 for positioning are formed on the bottom surface portion of the computer main body 1. Pins 75, which correspond to the holes 65, are formed on the unit 2. The pins 75 are engaged with the holes 65, so that the computer main body 1 is set to a predetermined position of the unit 2.

According to the above-mentioned structure, in the case of the system in which the computer main body 1 and the expanded unit 2 are combined with each other, the heat sink 30 of the computer main body 1 is cooled by cool air from the fan 50 of the unit 2. In other words, when the fan 50 of the unit 2 is driven, cool air is sent to the vent 60a from the fan 50 through the vent 70a. As a result, cool air is sent to the heat sink 30 through the vent 60a.

In other words, cool air is supplied to the interior of the computer main body 1 from the fan 50, so that the radiation effect of the heat sink 30 can be improved. Similar to the third embodiment, CPU 15 can be operated at high speed for a long time even if the size of the computer main body 1 is small.

(Modification of Fourth Embodiment)

Figure 16:
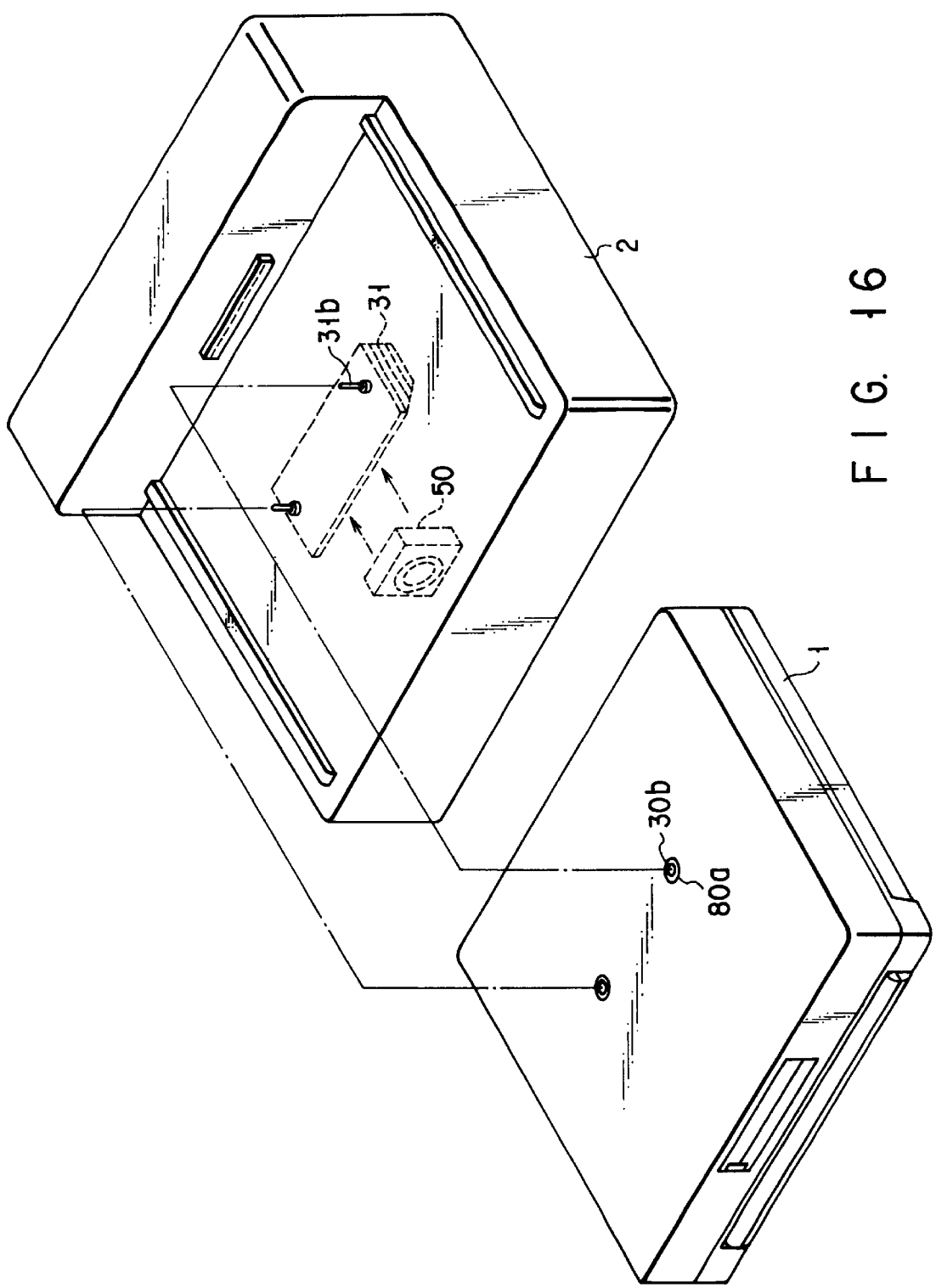

FIGS. 16 and 17 are views showing a modification of the fourth embodiment.

As shown in FIG. 16, opening portions 80a are formed on the bottom surface portion of the computer main body 1. Moreover, as shown in FIG. 17, the computer main body 1 is structured such that the top end portion 30b (where radiation fin is formed) of the heat sink 30 is provided in the vicinity of the opening portion 80a. The expanded unit 2 has the rod-shaped heat conductive members 31b at the position opposite to the opening portions 80a. The heat conductive members 31b are connected to the heat sink 31 provided in the expanded unit 2. Moreover, the cooling fan 50 of the unit 2 is structured such that cool air is sent to the heat sink 31.

According to the above-mentioned structure, in the case of the system in which the computer main body 1 and the expanded unit 2 are combined with each other, the heat conductive members 31b of the unit 2 are engaged with the opening portions 80a of the housing, so that the heat sink 30 and the heat sink 31 are connected to each other through the heat conductive members 31b.

Thus, according to the system of this embodiment, the heat sinks 31 of the expanded unit 2 and the heat sinks 30 of the computer main body 1 are connected to each other so as to improve radiation effect. Also, the heat sinks 31 can be cooled by cool air from the cooling fan 50 of the expanded unit 2. As a result, the radiation effect of the computer main body 1 can be improved.

By use of the expanded unit having such the radiation function, CPU 15 can be operated at high speed for a long time even if the size of the computer main body 1 is small.

(Fifth Embodiment)

FIG. 18 is a flow chart according to a fifth embodiment off the present invention.

In this embodiment, it is assumed that the system excepting the temperature sensor 45 of the computer system of FIG. 9 is used. In this system, the CPU 15 has a function of selecting the full power mode or the low power mode by whether or not the expanded unit 2 is used.

The CPU 15 of the computer main body 1 discriminates whether or not the unit 2 is connected to the computer main body 1 at a system starting time. As a method for discriminating, there may be used a well-known method such as a method in which the control signal is input from the unit 2 or a method in which the CPU 15 accesses the unit 2.

If the unit 2 is connected to the computer main body 1, the CPU 15 sets the full power mode (steps S12, S13). The full power mode is an operation mode in which the operation can be executed at the maximum consumption power of the power specification of the system. Specifically, in the full power mode, the CPU 15 can execute a high speed calculation processing by the high speed clock. If the system is set to a power saving by the battery drive motor or the designation from the user, the CPU 15 executes the operation in the low power mode (YES of step S14, step S18). The low power mode is an operation mode in which the calculation processing can be performed at the clock whose frequency is lower than the maximum specification. In this embodiment, When the low power mode is set, the CPU 15 stops the cooling fan 50 of the unit 2 (step S16). Thereby, the consumption power necessary for the drive of the cooling fan 50 can be saved. When the full power mode is set, the cooling fan 50 is driven, so that the computer main body 1 can obtain high radiation effect. As a result, CPU 15 can execute the operation in the full power mode (No of steps 14, step S15).

If the extended unit 2 is not connected to the computer main body 1, that is, the computer main body 1 is singly operated, the CPU 15 restricts the operation in the full power mode, such as the high speed calculation processing. As a result, the CPU 15 sets the lower power mode (NO of step S12, step S17). In other words, the CPU 15 executes the low speed operation at the clock whose frequency is lower than the maximum specification (step S18). In the case of only the computer main body 1, the radiation effect due to only the heat sink 30 can be obtained. As a result, sufficient radiation effect cannot be always obtained in the operation state under the full power mode. For this reason, the CPU 15 restricts the operation in the full power mode so that unexpected trouble such as system-down can be prevented from occurring in advance.

Thus, by connecting the expanded unit 2 having the built-in cooling fan 50 to the computer main body 1, the radiation effect of the computer main body 1 can be improved. In the case of using the expanded unit 2, the operation under the full power mode in which the sufficient radiation effect is assumed can be executed. Conversely, in the case of using no expanded unit 2, the operation mode in which the radiation by only the heat sink 30 of the computer main body 1 is assumed is set. In other words, the low power mode, which restricts the operation under the full power mode, is set. As a result, the operation of CPU, which is adaptable to the radiation effect, can be realized. Moreover, the system of this embodiment has the function of stopping the cooling fan 50 of the expanded unit 2 at the lower power mode time. Thereby, even if the expanded unit 2 and the computer main body 1 are connected to each other, the cooling fan 50 is not always driven, so that the saving of the consumption power of the system can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A computer system comprising:
   a computer main body;
   an expanded unit detachable from the computer main body, the expanded unit adding a predetermined function to the computer main body when the expanded unit is attached to the computer main body;
   a first heat sink provided in the computer main body; and
   a second heat sink provided in the expanded unit, the second heat sink and the first heat sink being connected to each other, and functioning in cooperation with each other, when the expanded unit is attached to the computer main body.

2. The computer system according to claim 1, further comprising:
   a connecting means having an interpose member positioned between the first heat sink and the second heat sink for connecting the first heat sink and the second heat sink to constitute an extended radiator member for the computer main body.

3. The computer system according to claim 2, wherein said interpose member is formed of a thermally conductive material.

4. The computer system according to claim 2, further comprising a first expanded connector, provided in the computer main body, and a second expanded connector provided in the expanded unit, where the connecting means connects the first heat sink and the second heat sink to each other in accordance with a connection between the first and second expanded connectors upon connecting the expanded unit to the computer main body.

5. The computer system according to claim 4, wherein the connecting means is provided separate from the section for connecting the first and second expanded connectors.

6. The computer system according to claim 2, wherein the connecting means includes an opening portion, which contacts an outer unit provided in the computer main body, the connecting means including the interpose member being provided in the expanded unit and connected to the second heat sink, where the interpose member and the first heat sink are brought into contact through the opening portion when the expanded unit is connected to the computer main body, forming a connection between the first heat sink and the second heat sink.

7. The computer system according to claim 6, wherein the opening portion is provided separate from the section for connecting the first and second expanded connectors.

8. The computer system according to claim 1, wherein the first heat sink is placed in the vicinity of a circuit board or other device which serves as a heat generating source of the computer main body, and a top end portion of the first heat sink is positioned in the vicinity of a connection section to be connected to the expanded unit.

9. The computer system according to claim 1, wherein the expanded unit is dedicated to a radiation function and includes only the second heat sink.

10. The computer system according to claim 1, wherein the expanded unit has fan means for sending cool air to the second heat sink.

11. The computer system according to claim 1, wherein the first heat sink accumulates heat in the computer main body and radiates the heat, and heat is transferred between the first heat sink and the second heat sink when the expanded unit is attached to the computer main body.

12. A computer system comprising:
   an expanded unit, having a structure to be detachable from a computer main body, connected to the computer main body to realize a predetermined expanded function;
   a first radiator means, provided in the computer main body, for radiating an interior of the computer main body;
   a second radiator means, provided in the expanded unit, for radiating the interior of the computer main body, said second radiator means contacting said first radiator means when the expanded unit is connected to the computer main body;
   means for detecting that the expanded unit is connected to the computer main body; and
   means for setting an operation mode of the computer main body to a normal power mode when the computer main body is singly operated without the expanded unit, and to a high power mode when the detecting means detects an existing connection between the computer main body and the expanded unit, the high power mode being higher in power than the normal power mode.

13. The computer system according to claim 12, wherein the means for setting sets the operation mode of the computer main body to the normal power mode, which restricts time when the computer main body is operated under the normal power mode or the high power mode, at a non-connecting state of the first and second radiator means.

14. The computer system according to claim 12, wherein the setting means sets the operation mode of the computer main body to the first power mode, which restricts time when the computer main body is operated under the first power mode or the second power mode, at a non-corrected state of the first and second radiator means.

15. A computer system comprising:

an expanded unit, having structure to be detachable from a computer main body, connected to the computer main body to realize a predetermined expanded function;

a first radiator material, provided in the computer main body, for radiating an interior of the computer main body;

a second radiator material provided in the expanded unit, for radiating the interior of the computer main body; and connecting means for connecting the first and second radiator materials to each other when the expanded unit is connected to the computer main body;

wherein the expanded unit has fan means for sending cool air to the second radiator material; and wherein the connecting means has a rod-shaped heat conductive member, and connects the first and second radiator material to each other through the heat conductive member.

16. The computer system according to claim 15, wherein the rod-shaped heat conductive member is provided in the expanded unit to be connected to the second radiator material, and the rod-shaped heat conductive member is connected to the first radiator material through an opening portion formed in the computer main body when the expanded unit is connected to the computer main body.

17. A computer system comprising:

a computer main body having a mounting surface;

an expanded unit detachable from the computer main body, the expanded unit adding a predetermined function to the computer main body when the expanded unit is attached to the computer main body, the expanded unit having an opening formed through an outer surface;

a heat sink provided on the mounting surface of the computer main body; and means for sending air through the opening to the heat sink of said computer main body when the expanded unit is attached to the computer main body.

18. The computer system according to claim 17, further comprising:

means for detecting that the expanded unit is connected to the computer main body; and means for setting an operation mode of the computer main body to a first power mode when the computer main body is singly operated without using the expanded unit and to a second power mode when the detecting means detects a connection between the computer main body and the expanded unit, the second power mode being higher in power than the first power mode.

19. The computer system according to claim 17, wherein the computer main body has a CPU which operates at a low speed at a low clock frequency when the first power mode is set, and which operates at a high speed at a high clock frequency when the second power mode is set.

20. A computer system comprising:

a computer main body;

an expanded unit detachable from the computer main body, the expanded unit adding a predetermined function to the computer main body when the expanded unit is attached to the computer main body;

a first heat sink provided in the computer main body, for accumulating heat in the computer main body and radiating the heat; and a second heat sink provided in the expanded unit, for radiating the heat of the first heat sink, wherein the second heat sink and the first heat sink are connected to each other, and function in cooperation with each other, when the expanded unit is attached to the computer main body.

* * * * *